Dec. 17, 1963  S. B. DUNHAM  3,114,877
PARTICLE DETECTOR HAVING IMPROVED UNIPOLAR CHARGING STRUCTURE
Filed Oct. 30, 1956  2 Sheets-Sheet 2
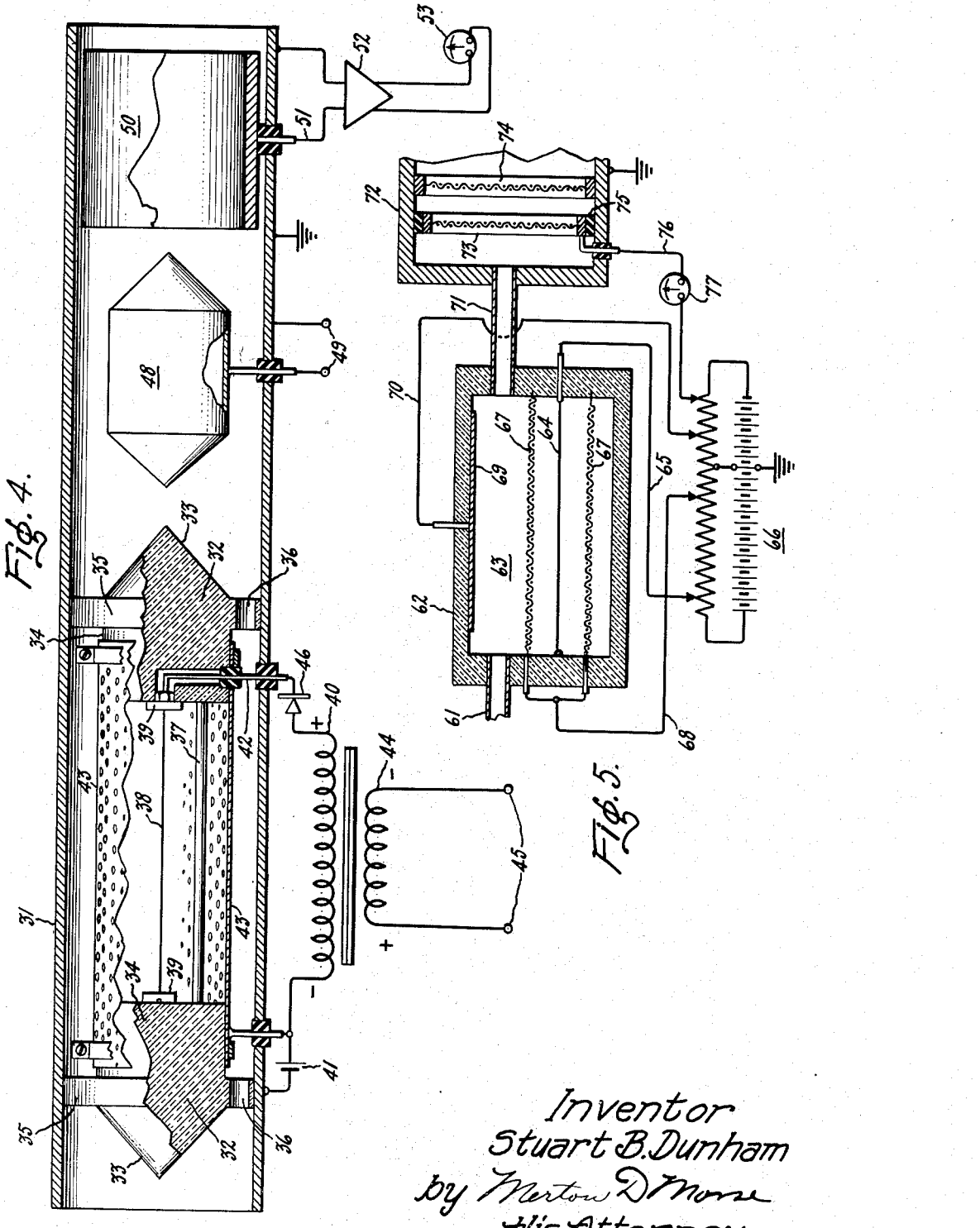
Inventor
Stuart B. Dunham
by Merton D. Morse
His Attorney US United States Patent Office 3,114,877
Patented Dec. 17, 1963

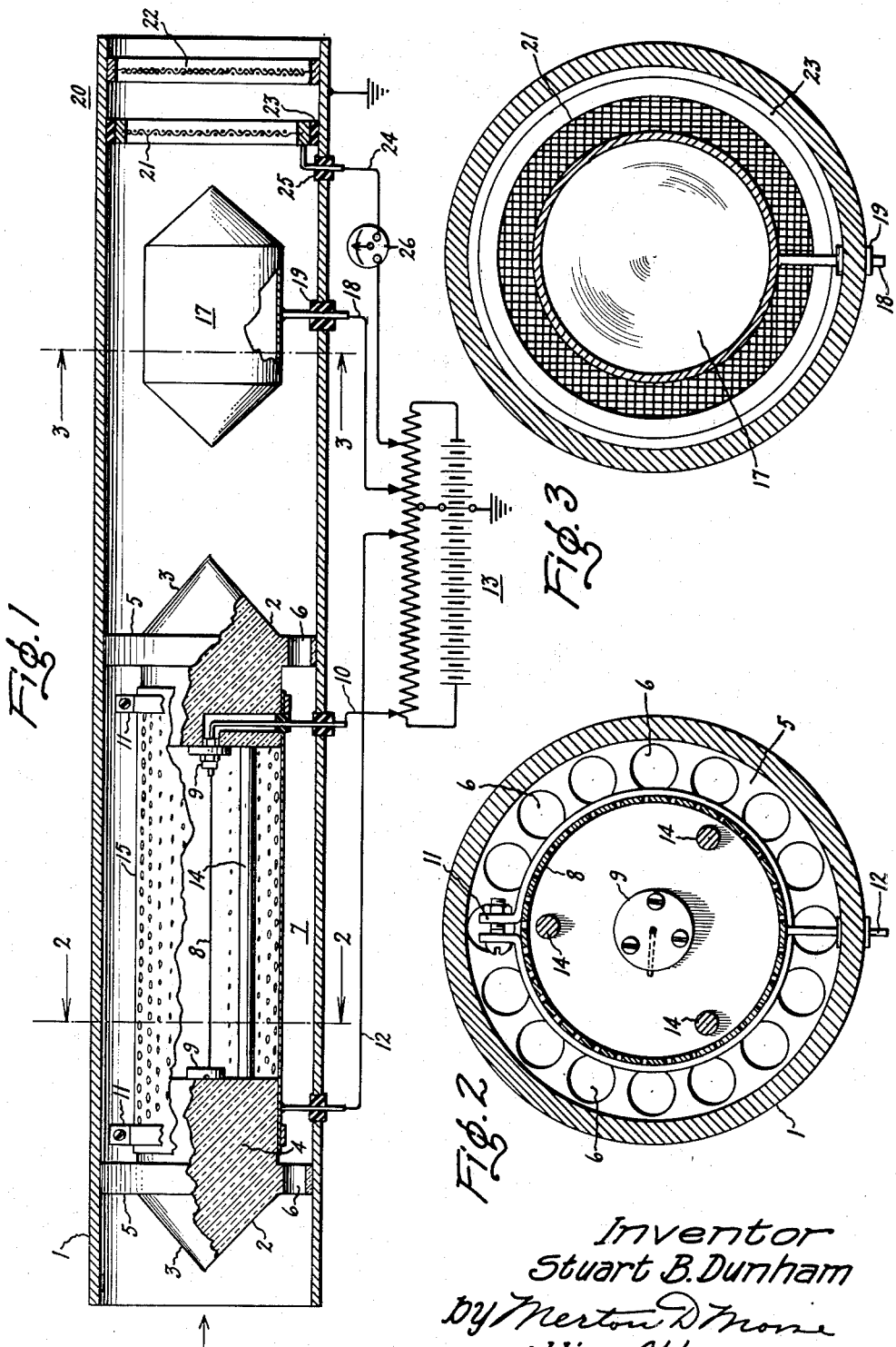

3,114,877
PARTICLE DETECTOR HAVING IMPROVED
UNIPOLAR CHARGING STRUCTURE
Stuart B. Dunham, Schenectady, N.Y., assignor to
General Electric Company, a corporation of New York
Filed Oct. 30, 1956, Ser. No. 619,345
7 Claims. (Cl. 324—71)

This invention relates to a method and apparatus for detecting and measuring small suspended particles in a gas. More specifically, it relates to a method and apparatus in which the particles to be measured are given an electrical charge.

A thorough and accurate knowledge of the particle population of a gaseous medium such as the atmosphere is both desirable and necessary for many purposes. The increasingly critical problem of air pollution presents one significant area wherein an instrument for detecting and measuring particles is of paramount importance.

Similarly, meteorological studies require an instrument capable of measuring the concentrations of atmospheric particles in the upper atmosphere. Air pollution and meteorological studies are but a fragmentary recital of the utility of an instrument providing a measure of particulate matter in a gaseous medium.

For the sake of convenience and clarity, the term particle is utilized generally in this specification and is intended to cover particulate matter such as dust, smokes, fogs, flyash, aerosols, etc.; i.e., all particles capable of being charged.

In the past there have been various attempts to construct particle-detecting instruments. These prior art devices are generally classifiable into three categories. First, mechanical devices in which the particles to be measured are removed by means of mechanical action such as centrifugal action and measured to provide an index of the number of particles. Secondly, optical devices wherein the particles are measured by determining the light transmission characteristics of the gaseous medium. Thirdly, electrical devices wherein the particles are electrically charged by means of a corona forming device, or the like, and the change in magnitude of the corona current necessary to charge the particles provides a measure of the number of particles present.

Of these various types of particle detectors, the one enjoying at least a modicum of success has been the corona charging apparatus. Although this type of instrument has enjoyed a moderate success as a particle detector, it suffers from several inherent flaws which have severely limited both its utility and its accuracy. This type of instrument, as has been pointed out previously, determines the particle population by measuring the change in the corona current necessary to charge the particles suspended in the gas. However, utilizing the corona current as the parameter representative of the particle population presents certain inherent difficulties. The Townsend expression for the corona current voltage characteristic $$I = \text{const } V(V - V_c)$$

indicates that the corona current $I$ is a parabolic function of the impressed voltage above the starting voltage $V_c$. The value of $V_c$ depends on various structural characteristics of the corona discharge apparatus such as point to plane distance, point radius, surface conditions, etc., thus making the corona current dependent on various control parameters other than the number of particles present. As a result, utilizing the corona current as the measurable parameter raises difficulties which preclude high orders of accuracy and sensitivity.

In addition, it has been found that utilizing corona forming elements of standard configuration introduces another source of error. That is, it has not been possible with the prior art devices to charge all of the particles, the reason being that it has been found difficult to produce exclusively unipolar ions so that all of the particles are charged substantially to the same polarity. That is, in such a corona discharge, both negative and positive ions are produced which charge some of the particles to opposite polarities. Such oppositely charged particles then tend to recombine and lose their charge leaving uncharged particles. The presence of these uncharged particles introduces substantial inaccuracies into any reading obtained since obviously these particles have not been detected and measured.

Furthermore, in order to insure the highest accuracy, it is also necessary that only the "charged" particles provide an indication. Thus, it becomes necessary to remove any excess ions which have not been utilized to charge a particle but which are capable of giving an indication. Unless this is done, a serious error may be introduced into any readings obtained since a portion of this reading must be attributed to ions rather than to charged particles.

It is an object of this invention, therefore, to provide an improved method and apparatus for detecting and measuring the number of small particles suspended in a gaseous medium by charging them electrically.

Another object of this invention is to provide a method and apparatus for detecting and measuring suspended particulate matter of increased efficiency by charging substantially all of the particles to a single polarity.

Yet another object of this invention is to provide a method and apparatus for detecting and measuring suspended particulate matter wherein only charged particles produce an indication.

Other objects and advantages will become apparent as the description of the invention proceeds.

To carry out the principles and objects of the instant invention, there is provided a unipolar generator of the corona discharge type for producing substantially unipolar ions which are injected into a particle bearing gaseous medium to charge all of the particles to a uniform polarity. To this end there is provided a direct current energized corona electrode to produce ions which are substantially of one polarity. The corona electrode is positioned within a second perforated electrode maintained at a voltage such that all of the ions of one polarity are drawn thereto and permitted to pass through the perforations whereas all ions of the second polarity are repelled thereby. In this manner only ions of one polarity are permitted to pass into the gaseous medium and, consequently, the particles are charged to but a single polarity and consequently a much larger proportion of the particles are charged.

The charged particles are detected by means of an electrode positioned downstream of the unipolar generator, the current flow from said collecting electrode being a measure and index of the number of particles. The collecting electrode may, in one case, be a circular screen member having a potential applied thereto so that the particles are collected thereon and lose their charge to produce a current flow, while in an alternative form, the collecting electrode may be a hollow cylindrical probe member which has a current induced therein by virtue of the electrostatic field about the charged particle.

In an alternative embodiment, the corona forming electrode of the unipolar generator is connected to a pulsed energy source whereby successive regions of charged and uncharged particles are produced in the flowing gaseous medium. The hollow cylindrical probe, previously described, may be utilized with a pulsed system of this type in order to induce a pulsating current therein which may then be amplified by means of an alternating current amplifier and measured by a current measuring means.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 represents an embodiment partially in cross-section of the particle detector of the instant invention;

FIG. 2 is a sectional view taken along the lines 2—2 of FIG. 1;

FIG. 3 is a sectional view taken along the lines 3—3 of FIG. 2;

FIG. 4 is an alternative embodiment of the particle detector of FIG. 1, and

FIG. 5 is yet another alternative embodiment of the particle detector of the instant invention.

Referring now to FIG. 1, there is shown one embodiment of a particle detector illustrating the features of the instant invention. There is provided a hollow grounded metallic conduit 1 through which a particle bearing gaseous medium is adapted to flow, the direction of flow being illustrated, for the sake of convenience, from left to right. Positioned within the conduit 1 is a unipolar charging means which functions to produce substantially unipolar ions to be injected into the particle bearing gas to charge the particles to substantially a single polarity. In addition, there is provided an air flow directing means which channels the flow of the gaseous medium around the unipolar generator so that only injected unipolar ions are effective in charging particles. To this end there is provided a pair of support members 2 constituted of an insulating material and having a streamlined cone-shaped portion 3 and a cylindrical main body portion 4. A disc-shaped barrier member 5 extends from the main body member 4 and is positioned transversely to the conduit 1. Positioned around the periphery and extending through the disc elements 5 are a multiplicity of passageways 6, which may be most clearly seen with reference to FIG. 2. The barrier members 5 and their associated passageways 6 direct the flow of the particle bearing gaseous medium so that the gas in flowing past the unipolar charging means flows only in an annular space along the conduit walls. The necessity for this manner of gas flow will be explained in greater detail later in conjunction with the description of the unipolar charging means.

Positioned between the support members 2 and supported therebetween is a unipolar charging means 7 constituting a source of unipolar ions which are injected into the gaseous medium to charge the particles therein. The unipolar generator 7 comprises an elongated corona forming electrode 8 positioned within and coaxial with the conduit member 1. The corona forming electrode 8 is supported between a pair of terminal blocks 9 mounted upon the respective support members 2. One end of the corona forming electrode 8 is connected to a source of high direct current voltage 13 which, for the sake of simplicity, is illustrated as a battery but which may obviously be a rectifier system, through any convenient wire 10 extending through the wall of the conduit 1 by means of an insulating bushing. The lead 10 is connected to a point which is maintained at a very high positive voltage with respect to a reference level such as ground. The voltage on the corona forming electrode 8 is sufficiently high to cause a breakdown of the surrounding gas to produce positive corona and consequently a large number of positive ions. With such a positive voltage on the corona forming electrode 8, most of the ions formed by the corona discharge will be positive ions. However, a substantial number of negative ions will also be produced.

As has been pointed out previously, it is desirable that only unipolar ions, which in this case would be the positive ions, be injected into the particle bearing gaseous medium. To this end there is provided a second perforated electrode 15 coaxial with the corona forming electrode 8. The perforated electrode 15, which may in some cases be constituted of a foraminous material such as wire screening is fastened on the support members 2 by means of a pair of metallic strap members 11 which may be seen most clearly with reference to FIG. 2. The electrode 15 is maintained at a potential which is very negative relative to that of the corona forming electrode so that the positive ions are drawn thereto and permitted to pass through the perforations into the gaseous medium while the negative ions are repelled thereby and forced to return to the corona electrode 8.

In order to achieve this result, the perforated electrode 15 is connected by means of a convenient wire 12 to the source of voltage 13 at a point which is slightly positive with reference to ground but is very highly negative with respect to the corona forming electrode 8. Thus, only unipolar ions are injected into the gaseous medium through the perforated electrode element 15, and the particles will be charged to a single polarity. Thus, a larger number of the particles will remain charged since no neutralization of oppositely charged particles will take place as would be the case if ions of both polarities were injected into the gaseous medium. In addition, by directing the flow of the gaseous medium along the periphery of the conduit, so that is passes in the annular space between the conduit wall and the perforated electrode 15, only those ions projected through the electrode 15 are effective in charging the particles suspended in the gaseous medium. In this manner, then, the particles in the gaseous medium are charged to a single polarity, in this instance positive, in order to permit their measurement by virtue of this acquired electrical characteristic.

Positioned downstream of the unipolar charging means is a means to remove any excess ions from the gas stream. As has been pointed out previously, any excess ions which have not charged the particles must be removed from the gas stream in order that these ions do not impinge upon the collecting means and introduce an erroneous indication. Consequently, there is provided an ion trap 17 constituted of a cylindrical electrode positioned within and coaxial with the conduit 1. The cylindrical electrode being thus positioned provides an annular passageway between itself and the conduit wall through which the gaseous particle bearing medium must pass. A relatively small direct current potential is applied to the electrode 17 by means of a convenient wire 18 passing through the conduit by virtue of an insulating bushing 19. The wire 18 is connected to a point on the voltage source 13 which is negative with respect to ground. The conduit 1 is maintained at ground potential so that a potential gradient exists across the annular space between the electrode 17 and the conduit 1. This gradient causes molecular and other small positive ions in the gaseous medium to migrate to the electrode 17 where they lose their charge. The larger charged particles in the gaseous medium, on the other hand, have less mobility and, therefore, migrate much less rapidly. Therefore, most of the larger particles do not reach the wall but follow the air stream through this small ion trap.

The dimensions of the circular electrode 17, the air stream velocity, and the value of direct current potential applied determine the maximum size of particle effectively collected by the small ion trap. These parameters, as is well known to those skilled in the art, may be chosen to remove ions up to any predetermined size from the air stream. In the instant case, the parameters are chosen in such a fashion that substantially all of the charged particles pass through without being attracted while only the molecular or small ions are collected by the electrode 17.

Positioned downstream of the ion trap 17 is a means to measure the total charge on the particles as an index of the number of the particles. There is provided a charge collecting structure 20 constituted of a pair of parallel circular screen members 21 and 22 positioned across the conduit 1. The screen member 21 acts as a collecting electrode towards which the charged particles are drawn and to which they lose their charge to produce a current flow. Consequently, the screen 21 is maintained at a potential which establishes an electric field of such a nature as to draw the charged particle thereto. That is, the screen 21 is isolated from the grounded conduit 1 by means of an annular insulating member 23, while the screen itself is connected to a source of negative potential with respect to ground by means of a lead 24 extending through an insulating bushing 25 in the conduit 1. In this fashion, the positively charged particles are drawn by the electric field towards the screen member and upon making contact lose their charge to produce a current flow from said screen to ground through the meter 26 and the source of potential 13.

A second screen member 22, which is maintained at ground potential, is provided to establish a potential gradient between the screens so as to prevent any charged particles which may have passed through the screen member 21 from passing further downstream. That is, any charged particle which has not been collected by the collecting screen 21 will be repelled by the screen 22, since it is positive relative to screen 21, so that it may be recaptured. In this fashion, substantially all of the charged particles are intercepted by the collecting screen 21 so that the current flowing from the screen 21 through the meter 26 provides a highly accurate measure of the number of particles suspended in the gaseous medium.

The operation of the detector of FIG. 1 may be briefly described as follows: A particle bearing gaseous medium enters the conduit 1 at the left and is directed by means of the streamlined portion 3 of the supporting member 2 through the passageways 6 of the barrier member 5 so that the stream of gas passes through the annular space bounded by the conduit 1 and the perforated electrode member 15. Positive ions are injected into this annular space through the perforated electrode 15 from the corona forming electrode 8 positioned therein. The positive ions thus injected charge substantially all of the particles to a uniform charge, in this case positive. The charged particles pass through the second supporting member into the influence of the ion trap 17. Here, all excess ions which have not been utilized to charge particles, are removed from the gaseous medium by virtue of the potential gradient established between the cylindrical electrode 17 and the conduit 1.

The charged particles, however, by virtue of their lesser mobility pass through the ion trap 17 without being eliminated. These charged particles upon further movement downstream are brought into the influence of the electric field produced by the collecting screen 21. This electric field is such that all of the particles are drawn to the collecting electrode 21 and upon making contact therewith lose their charge. The deposition of the charges from the suspended particles causes a flow of current from the collecting electrode 21, through the lead 24, through an ammeter 26 to ground. This flow of current is registered on the ammeter 26 or any other similar current measuring device and produces an index of the number of particles collected. Since, by virtue of this construction, substantially all of the particles are collected by the screen 21, the current measured by the meter 26 presents a highly accurate indication of the number of suspended particles in the gaseous medium.

Referring now to FIG. 4, there is illustrated an alternative embodiment of the particle detector of FIG. 1 in which the unipolar charging means is periodically energized by means of a pulsating voltage to generate unipolar ions periodically.

There is provided, in a manner similar to that illustrated in FIG. 1, a grounded conduit 31 through which a particle bearing gaseous medium is adapted to flow. Positioned within the conduit 31 are a pair of support members 32 of similar construction. The support members 32 again comprise a streamlined cone-shaped portion 33 and a cylindrical main body portion 34. A disc-shaped barrier member 35 extends from the body portion 34 and contains a number of passageways 36 through which the particle-laden gaseous medium passes. The two support members 34 are supported and separated by means of three metallic supporting rods 37 of the type illustrated in FIG. 1. Positioned between the spaced support members 32 is a unipolar charging means 38 which produces a periodic supply of unipolar ions to charge the particles in the gaseous medium.

The unipolar charging means 38 again constitutes an elongated corona forming electrode positioned within and coaxial with the conduit 31, the corona electrode 38 being supported by means of a pair of terminal blocks 39 positioned respectively on each of the support members 32. Surrounding the corona forming electrode 38 and coaxial therewith is a perforated electrode member 43 which is fastened to the members 32 by means of the metallic clamp elements 47. The corona forming electrode 38, in conjunction with the coaxial perforated electrode 43, functions to produce unipolar ions which are injected into the gaseous stream in order to charge the particles therein substantially to a single polarity. The unipolar charging means 38 of FIG. 4, however, is of the periodic type in that the ion producing corona discharge is not continuous but occurs periodically.

Thus, the corona forming electrode 38 is connected to one side of the secondary 40 of a suitable step-up iron core transformer by means of any convenient wire 42, the other terminal of said secondary being connected to the perforated electrode 43. The primary 44 of the transformer is energized from a suitable source of voltage, such as an alternating current source 45, not shown. Connected in series with the secondary 40 is a unidirectional conducting device 46, so poled as to conduct only during one-half cycle of the alternating current voltage. As a result, current flows through the secondary 40 only during one-half cycle of the energizing voltage. Thus, there is applied to the corona forming electrode 38 a pulsating positive voltage. The periodic corona discharge produces unipolar ions, in this case again positive ones, which are drawn through the perforated electrode 43 by virtue of the fact that the electrode 43 is connected to the opposite terminal of the secondary 40 and is thus highly negative relative to electrode 38. Thus, the particles in the gaseous medium flowing through the annular space between the electrode 43 and the conduit 31 are periodically charged to a single polarity.

During the remaining half cycle of the energizing voltage, no voltage is applied to the electrode 38 since the unidirectional conducting device 46 is in its nonconducting stage, and consequently no corona discharge and no ions are produced by the charging means 38. As a result, during this portion of the cycle none of the particles suspended in the gaseous medium are charged. Hence, the gaseous medium, in passing downstream from the unipolar charging means 38, will be constituted of alternating regions of charged and uncharged particles.

A biasing means 41, comprising a battery or the like, is connected between one end of the transformer secondary 40 and the grounded conduit 31. In this fashion the conduit 31 is maintained at a potential which is more negative than that of the electrode 43, so that a potential gradient exists across the annular space between the conduit 31 and the electrode 43. This gradient aids in pulling the positive ions through the perforated electrode 43 and into the particle bearing gaseous stream.

Positioned downstream from the unipolar charging means 37 is an ion trap constituted of a cylindrical metallic electrode 48, connected to a source of direct current 49. The source of direct current 49 is connected between the cylindrical electrode 48 and the conduit 31 and establishes a voltage gradient in the annular space between the electrode 48 and the conduit. As was pointed out previously, this gradient causes molecular and other small ions in the air stream to migrate to the walls of the cylinder where they lose their charge while larger charged particles of less mobility pass through the annular space.

The gaseous stream containing the charged suspended particles is passed through a hollow cylindrical probe member 50 and induces, by virtue of the electrostatic field around the particles, a charge on the probe surface and causes a current to flow indicative of the number of particles. That is, charges enclosed by the probe element 50 induce on the probe surface equal charges of the opposite polarity. Thus, when a region of the gaseous stream, containing the positively charged particles, passes through the cylindrical probe, a negative charge is induced on the probe surface; on the other hand, when a region containing no charged particles passes through, no charges are induced on the probe surface and, consequently, no current flows. Hence, these alternating regions of charged and uncharged particles cause a pulsating positive current to flow from the probe 50 through the input circuit of an alternating current amplifier 52, the amplitude of which is indicated by a meter 53 and which provides a measure of the number of particles.

The magnitude of the probe current is given approximately by the equation $$I = VNwq \sin wt$$

where V is the effective volume of air within which charges induce opposite charges upon the probe surface, N is the number of charged particles per unit volume of the gas stream, $w$ is $2\pi$ times the corona repetition frequency, and $q$ is the average charge per particle in regions of maximum charge.

It is evident from the above equation that the sensitivity of the apparatus is directly proportional to the volume enclosed by probe 50, which indicates that it is desirable to make as large a probe as possible. On the other hand, the length of the probe should be less than the length of the gaseous stream regions within which particles carry like charges. That is, all of the charged particles in one charged region must have passed out of the influence of the probe before the next succeeding region of charged particles enters said probe. A good compromise is to make the probe length about one-fourth the wave length of the charged regions in the gaseous medium. For example, assuming a corona repetition frequency of 60 per second, and an air stream velocity of 30 feet/second, a probe length of 1.5 inches would be desirable. That is, in the absence of appreciable accelerative forces, the velocity of the charged particles may be assumed to be approximately equal to the velocity of the air stream. Then, the wave length of the charged region is $$30 \times \frac{12}{60} = 6 \text{ inches}$$

One-fourth of this distance will then be 1.5 inches.

Since the current flowing from the hollow cylindrical probe 50 is of a pulsating nature, it is relatively easy to amplify this current by means of an alternating current amplifier and consequently to measure said current. This fact is of substantial significance since the use of alternating current amplifiers, rather than direct current amplifiers with their inherent drift problems, provides a highly effective and accurate measuring apparatus.

The apparatii hitherto disclosed had the unipolar particle detector positioned within the conduit through which the particle bearing gaseous medium flows. Hence, these conduits have been of substantial size in order to accommodate the unipolar charging means. It is possible of course, to construct a particle detector embodying the features of the instant invention wherein the unipolar particle charging means is exterior of the gas bearing conduit thus permitting the utilization of much smaller conduits.

Referring now to FIG. 5, there is illustrated an alternative embodiment of the particle detector of the instant invention wherein the unipolar charging means is positioned externally of the conduit elements. To achieve these objects and purposes, there is provided a chamber means 62 constituted of insulating material and having an internal opening 63. An input conduit 61 adapted to carry a particle bearing gaseous medium extends through one wall of the chamber 62 and communicates with the interior 63. An output conduit member 71 extends through the opposite wall of the chamber 62 and is adapted to permit flow of the gaseous medium now carrying charged particles out of the chamber 62.

Positioned within the chamber 62 and in the lower portion thereof, is a unipolar charging means of the corona forming type which produces unipolar ions to be injected into the gaseous stream. The unipolar generator consists of an elongated corona forming electrode 64 supported between two walls of the chamber 62. One end of the corona forming electrode 64 extends through the wall of the chamber and is connected by means of a wire 65 to the very highly positive terminal of a source of direct current voltage 66. The corona forming electrode 64 is thus maintained at a sufficiently high positive potential to form a positive corona with the attendant positive ions. Positioned on either side of the corona forming electrode 64 are a pair of flat perforated electrodes 67 constructed of wire screening. Both of the perforated electrodes 67 are connected to the source of voltage 66 by means of a wire 68. The electrodes 67 are thus maintained at a voltage which is very negative relative to corona forming electrode 64. As a result, a strong potential gradient is established therebetween and only the positive ions will be drawn to and pass through electrodes 67 while any negative ions produced will be repelled and forced to return towards the electrode 64. In this fashion, positive ions are permitted to pass through the perforated electrode 67 and into the opening 63.

Positioned along the upper wall of the interior opening 63 is a metallic plate 69 which is connected by means of the lead 70 to the source of voltage 66. The metallic plate 69 is maintained at a voltage which is negative with respect to both the corona forming electrode 64 as well as the perforated electrodes 67. The plate electrode 69 performs two functions. Since it is more negative than the perforated electrode 67, it aids that electrode in pulling positive ions out of the unipolar charging means and into the gas stream. Furthermore, since this plate member is maintained at a negative potential with respect to the electrodes as well as to a reference potential such as ground, it functions to remove any excess ions in the gas stream which have not been utilized to charge particles. That is, any small excess molecular ions are drawn towards the plate electrode 69 by virtue of their very high mobility and discharged there, while the larger and less mobile charged particles will not be affected thereby but will pass out of the chamber 62.

Connected to the output conduit 71 is a second chamber 72 constituted of a conducting material in which the charged particles are detected and measured in order to provide an indication of the number of particles in the gaseous medium. Positioned within the chamber 72 are a pair of metallic screen elements 73 and 74 which, in a manner similar to that described with reference to FIG. 1, produce a current which is an indication of the number of particles. The collecting screen 73 functions to draw all of the charged particles to it which upon impinging thereon lose their charge to produce a current which is a measure of the number of particles. The collecting screen 73 is separated from the metallic wall of the chamber 72 by means of a circular insulating ring 75. The electrode 73 is connected to a source of negative voltage by means of a lead 75 which is connected to the source of voltage 66 through an ammeter 77. The voltage applied to the collecting screen 73 is negative with respect to a reference voltage such as ground so that an electric field is set up about the electrode 73 which causes all of the positively charged particles to be drawn toward the screen and intercepted thereby.

Positioned downstream from the collecting screen 73 is a second screen 74 which is maintained in conductive contact with the grounded chamber 72. As has been pointed out with reference to FIG. 1, the second screen 74 functions to establish a potential gradient between the two screens of such a nature that any positive particle which has accidentally passed through the perforated collecting screen will be returned thereto. In this fashion, substantially all of the charged particles are intercepted by the collecting screen 73 to provide a current flow therefrom which is a highly accurate indication of the number of charged particles. The flow of current from the collecting electrode 73 passes through an ammeter 77, which may be of the microammeter type, to produce a deflection which provides an accurate indication of the number of particles suspended in the gaseous medium.

The various particle detectors referred to previously have been described with reference to a positive corona and positive ion production, it is to be understood, of course, that in carrying out the principles of the invention a negative corona may be utilized to produce negative ions.

From the foregoing description, it can be appreciated that the instant invention provides a particle detector of a very high order of accuracy in which substantially all of the particles suspended in a gaseous medium are detected and measured.

While a particular embodiment of this invention has been shown, it will, of course, be understood that it is not limited thereto since many modifications both in the circuit arrangement and in the instrumentalities employed may be made. It is contemplated by the appended claims to cover any such modifications as fall within the true spirit and scope of this invention.

What I desire to claim as new is:

1. In a particle detector, the combination comprising conduit means through which a particle bearing gas is adapted to flow, unipolar charging means including perforated electrode means, and a periodically energized corona forming means supported within the perforated electrode means and maintained at a potential different from the potential of the perforated electrode means for periodically producing unipolar ions to charge said particles to a single polarity, and means to measure the charges on said particles as an index of the number of particles.

2. In a particle detector, the combination comprising a conduit means through which a particle bearing gas is adapted to flow, charging means for producing unipolar ions to charge said particles to a single polarity, said charging means comprising a first ion producing corona forming electrode maintained at one potential, a second perforated electrode maintained at a potential whereby substantially only unipolar ions are permitted to pass therethrough, means to measure the charge on said particles as an index of the number of particles, and means to remove any excess ions produced by said charging means that have not charged said particles and have retained their high mobility in said gas prior to measuring the charges on said particles.

3. In a particle detector, the combination comprising a conduit means through which a particle bearing gas is adapted to flow, charging means positioned within said conduit for producing unipolar ions to charge said particles to a single polarity, said charging means comprising a first ion producing corona forming electrode maintained at one potential, a second perforated electrode means coaxial with said first electrode and maintained at a potential whereby only unipolar ions are permitted to pass therethrough, means to measure the charge of said particles as an index of the number of particles, and means to remove any excess ions produced by said charging means that have not charged said particles and have retained their high mobility in said gas prior to measuring the charges on said particles.

4. In a particle detector, the combination comprising a conduit means through which a particle bearing gas is adapted to flow, charging means for producing unipolar ions to charge said particles to a single polarity, said charging means comprising a first ion producing corona forming electrode positioned within said conduit and coaxial therewith and maintained at one potential, a second perforated cylindrical electrode coaxial with said first electrode and maintained at another potential, means to direct flow of said particle bearing gas between said conduit and said second electrode whereby only the unipolar ions passing therethrough charge said particles, means to measure the charge of said particles as an index of the number of particles, and means to remove any excess ions produced by said charging means that have not charged said particles and have retained their high mobility in said gas prior to measuring the charges on said particles.

5. In a particle detector, the combination comprising a conduit means through which a particle bearing gas is adapted to flow, a first corona forming electrode positioned within and coaxial with said conduit and maintained at a given potential to produce unipolar ions to charge said particles to a given polarity, a second perforated cylindrical electrode coaxial with said first electrode and maintained at a potential whereby only unipolar ions pass through, gas flow directing means comprising a circular barrier positioned across said conduit having a multiplicity of passageways positioned around the periphery thereof whereby the particle bearing gas flows between said conduit and said second electrode and only unipolar ions, passing through said second electrode, charge said particles, means to measure the charge on said particles as an index of the number of particles, and means to remove any excess ions produced by said charging means that have not charged said particles and have retained their high mobility in said gas prior to measuring the charges on said particles.

6. An apparatus for detecting suspended particulate matter comprising, a conduit adapted to have a particle bearing gaseous stream flowing therethrough, unipolar ion generating means including perforated electrode means maintained at a given potential, and corona forming means supported within the perforated electrode means and maintained at a potential different from the perforated electrode means positioned to inject unipolar ions into said stream to charge said particles to a single polarity, electrode means positioned within said conduit and defining with said conduit a flow passage for said particle bearing gaseous stream, said electrode having an energizing potential applied thereto of a magnitude such that a potential gradient is established across said flow passage whereby the highly mobile ions are drawn to said electrode means and discharged and the less mobile charged particles pass through, and means to measure the charge on said particles as an index of the number of particles.

7. In an apparatus for detecting and measuring the particle population of a gaseous stream, the combination comprising a conduit element through which said stream is adapted to flow, unipolar ion generating means including perforated electrode means maintained at a given potential, and corona forming means supported within the perforated electrode means, and maintained at a potential different from the perforated electrode means. to charge particles suspended in said stream to a single polarity, cylindrical electrode means positioned within said conduit and defining therewith an annular flow passage for said gaseous stream, means to establish a potential gradient between said electrode and said conduit of a magnitude such that the high mobile ions are drawn to said electrode and discharged while the less mobile charged particles pass through, means to measure the charge on said particles as an index of the number of particles.

References Cited in the file of this patent

UNITED STATES PATENTS

| | | |
|---|---|---|
| 1,070,556 | Strong | Aug. 19, 1913 |
| 1,168,227 | Schmidt | Jan. 11, 1916 |
| 1,808,709 | Blake | June 2, 1931 |
| 2,408,051 | Donelian | Sept. 24, 1946 |
| 2,932,966 | Grindell | Apr. 19, 1960 |